(12) United States Patent
Kim et al.

(10) Patent No.: US 11,538,278 B2
(45) Date of Patent: Dec. 27, 2022

(54) ELECTRONIC APPARATUS AND CONTROL METHOD THEREOF

(71) Applicant: Samsung Electronics Co., Ltd., Suwon-si (KR)

(72) Inventors: Jaeho Kim, Suwon-si (KR); Yeongrok Lee, Suwon-si (KR); Wonheui Jung, Suwon-si (KR); Jingu Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 17/014,106

(22) Filed: Sep. 8, 2020

(65) Prior Publication Data

US 2021/0103720 A1 Apr. 8, 2021

(30) Foreign Application Priority Data

Oct. 8, 2019 (KR) ........................ 10-2019-0124385

(51) Int. Cl.
*G06N 20/00* (2019.01)
*G06F 40/279* (2020.01)
(Continued)

(52) U.S. Cl.
CPC .......... *G06V 40/174* (2022.01); *G06F 40/279* (2020.01); *G06N 5/04* (2013.01); *G06N 20/00* (2019.01); *G10L 25/63* (2013.01)

(58) Field of Classification Search
None
See application file for complete search history.

(56) References Cited

U.S. PATENT DOCUMENTS 9,953,078 B2 4/2018 Kawamura
10,073,830 B2 9/2018 Walia et al.
(Continued)

FOREIGN PATENT DOCUMENTS

JP 2005-237668 A 9/2005
KR 10-2014-0094336 A 7/2014
(Continued)

OTHER PUBLICATIONS

International Search Report dated Jan. 20, 2021, issued in International Application No. PCT/KR2020/013186.
(Continued)

*Primary Examiner* — Dov Popovici
(74) *Attorney, Agent, or Firm* — Jefferson IP Law, LLP

(57) ABSTRACT

An electronic apparatus is provided. The electronic apparatus includes a user interface, a camera, a memory configured to store a first artificial intelligence model trained to obtain information on an emotion based on an input image, and a processor, connected to the user interface, the camera, and the memory, configured to control the electronic apparatus. The processor is configured to, based on text being input through the user interface, identify whether the text includes first information on a user's emotion, based on the text including the first information, obtain second information for the emotion by inputting the image obtained through the camera to the first artificial intelligence model, and identify a type of the user's emotion based on the first information obtained from the text and the second information obtained from the image.

20 Claims, 11 Drawing Sheets

(51) Int. Cl.
*G06V 40/16* (2022.01)
*G10L 25/63* (2013.01)
*G06N 5/04* (2006.01)

(56) References Cited

U.S. PATENT DOCUMENTS

| | | |
|---|---|---|
| 11,210,827 B2 * | 12/2021 | Lee ............... G06F 40/279 |
| 2010/0302254 A1 * | 12/2010 | Min ............... G06F 40/109 |
| | | 345/473 |
| 2014/0207811 A1 | 7/2014 | Kim et al. |
| 2015/0012463 A1 | 1/2015 | Rosenthal |
| 2015/0350125 A1 | 12/2015 | Henderson |
| 2017/0154210 A1 | 6/2017 | Li et al. |
| 2017/0364484 A1 * | 12/2017 | Hayes ............ G06F 40/109 |
| 2019/0171660 A1 | 6/2019 | Kershaw et al. |
| 2019/0182193 A1 | 6/2019 | Moskowitz |
| 2019/0190865 A1 | 6/2019 | Jeon et al. |
| 2019/0228552 A1 | 7/2019 | Lee et al. |
| 2019/0342243 A1 | 11/2019 | Lee et al. |

FOREIGN PATENT DOCUMENTS

| | | |
|---|---|---|
| KR | 10-1544639 B1 | 8/2015 |
| KR | 10-1613259 B1 | 4/2016 |
| KR | 10-2018-0075875 A | 7/2018 |
| KR | 10-2019-0026927 A | 3/2019 |
| KR | 10-2019-0089451 A | 7/2019 |
| WO | 2018/060993 A1 | 4/2018 |
| WO | 2019/100350 A1 | 5/2019 |

OTHER PUBLICATIONS

Written Opinion Report dated Jan. 20, 2021, issued in International Application No. PCT/KR2020/013186.
Extended European Search Report dated Aug. 8, 2022, issued in European Patent Application No. 20874541.4-1224.

* cited by examiner

FIG. 5A

| A user Text(Chat/Messenger) | |
|---|---|
| A: I'M SO TIRED TODAY.<br>I WANT TO GO HOME<br>EARLY TO TAKE SOME REST.<br><br>A: I'M SO SAD. | B: YOU HAVE HARD TIME TODAY. |

ELECTRONIC APPARATUS AND CONTROL METHOD THEREOF

CROSS-REFERENCE TO RELATED APPLICATION(S)

This application is based on and claims priority under 35 U.S.C. § 119(a) of a Korean patent application number 10-2019-0124385, filed on Oct. 8, 2019, in the Korean Intellectual Property Office, the disclosure of which is incorporated by reference herein in its entirety.

BACKGROUND

1. Field

The disclosure relates to an electronic apparatus and a method of controlling the same. More particularly, the disclosure relates to an electronic apparatus and a method of controlling a type of an emotion of a user.

The disclosure relates to an artificial intelligence (AI) system which simulates a function such as recognition, determination, or the like, of a human brain using a machine learning algorithm and an application thereof.

2. Description of Related Art

Recently, various electronic apparatuses capable of interacting with a user have been developed. In particular, electronic apparatuses that identify a type of a user's emotion for interaction with a user and operate according to the identified type of emotion have been developed. At this time, the type of the user's emotion may be identified using AI technology.

In the related art, when a type of the user's emotion is identified based on the user's image or the user's audio, a certain level of reliability may be secured, but there is a problem in that power consumption increases, since a camera or a microphone of an electronic apparatus needs to be always turned on.

When a user's image or the user's audio is applied to AI technology, there is a problem in that real-time processing is difficult, or a load increases due to real-time processing.

In order to avoid the problem of power consumption or load increase, a text that is input from a user may be used, in which case there is a problem in that the reliability is relatively lower than when using the user's image or the user's audio.

Accordingly, there is a need to develop a method of identifying a type of a user's emotion with high reliability while avoiding a problem of power consumption or a load increase.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus identifying a type of a user's emotion from a text and a method for controlling thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a user interface, a camera, a memory configured to store a first artificial intelligence model trained to obtain information on an emotion based on an input image, and a processor, connected to the user interface, the camera, and the memory, configured to control the electronic apparatus. The processor is configured to, based on text being input through the user interface, identify whether the text includes first information on a user's emotion, based on the text including the first information, obtain second information for the emotion by inputting the image obtained through the camera to the first artificial intelligence model, and identify a type of the user's emotion based on the first information obtained from the text and the second information obtained from the image.

The processor may, based on the text including the first information, obtain the image by turning on the camera, and input the obtained image to the first artificial intelligence model.

The processor may, based on a text additionally input after the camera is turned on not including first information on the user's emotion, turn off the camera.

The first information may include at least one first emotion information and first reliability information of each of the at least one first emotion information, the second information may include at least one second emotion information and second reliability information of each of the at least one second emotion information, and the processor is configured to identify a type of the user's emotion by obtaining a weighted sum of the first reliability information and the second reliability information by types of emotions.

The first information may include at least one first emotion information and first reliability information of each of the at least one first emotion information, and the processor may, based on the first reliability information of the at least one first emotion information being greater than or equal to a threshold value, identify that the text includes information on the emotion of the user.

The memory may store a second artificial intelligence model trained to obtain information on an emotion based on a text, and the processor may identify whether the text includes the first information from information obtained by inputting the text to the second artificial intelligence model.

The electronic apparatus may further include a microphone, and the memory is configured to store a third artificial intelligence model trained to obtain information on an emotion based on audio, and the processor is configured to, based on the text including the first information, turn on the microphone, obtain third information on an emotion by inputting audio received through the microphone to the third artificial intelligence model, and identify a type of the user's emotion based on the first information, the second information, and the third information.

The processor is configured to obtain a plurality of images through the camera in real time, and based on the text including the first information, input an image obtained from a time when the text is input among the plurality of images to the first artificial intelligence model.

The electronic apparatus may further include a display, and the processor is configured to control the display to display at least one recommended emoticon corresponding to the identified type of user's emotion.

The electronic apparatus is a mobile device and further includes a display, and the camera is configured to capture a front side of the display.

In accordance with another aspect of the disclosure, a method of controlling an electronic apparatus is provided. The method includes, based on text being input, identifying whether the text includes first information on a user's emotion, based on the text including the first information, obtaining second information for the emotion by inputting the image obtained through the camera of the electronic apparatus to a first artificial intelligence model, and identifying a type of the user's emotion based on the first information obtained from the text and the second information obtained from the image.

The obtaining the second information may include, based on the text including the first information, obtaining the image by turning on the camera, and inputting the obtained image to the first artificial intelligence model.

The method may further include, based on a text additionally input after the camera is turned on not including first information on the user's emotion, turning off the camera.

The identifying whether the first information is included may include identifying whether the text includes the first information from information obtained by inputting the text to the second artificial intelligence model.

The method may further include, based on the text including the first information, turning on a microphone of the electronic apparatus, and obtaining third information on an emotion by inputting audio received through the microphone to the third artificial intelligence model, and the identifying the type of user's emotion may include identifying a type of user's emotion based on the first information, the second information, and the third information.

The obtaining the second information may include obtaining a plurality of images through the camera in real time, and based on the text including the first information, inputting an image obtained from a time when the text is input among the plurality of images to the first artificial intelligence model.

The method may further include displaying at least one recommended emoticon corresponding to the identified type of the user's emotion through a display of the electronic apparatus.

The electronic apparatus is a mobile device including a display, and the obtaining the second information may include capturing a front side of the display through the camera.

According to various embodiments of the disclosure, the electronic apparatus may, based on a type of a user's emotion being identified from a text, turn on a camera or a microphone, thereby reducing power consumption, and may further consider an image or audio obtained from a camera or a microphone, thereby improving reliability of a type of user's emotion.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5A, 5B, and 5C are diagrams illustrating an embodiment of the disclosure in greater detail;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments will be described in greater detail with reference to the attached drawings.

Figure 1:
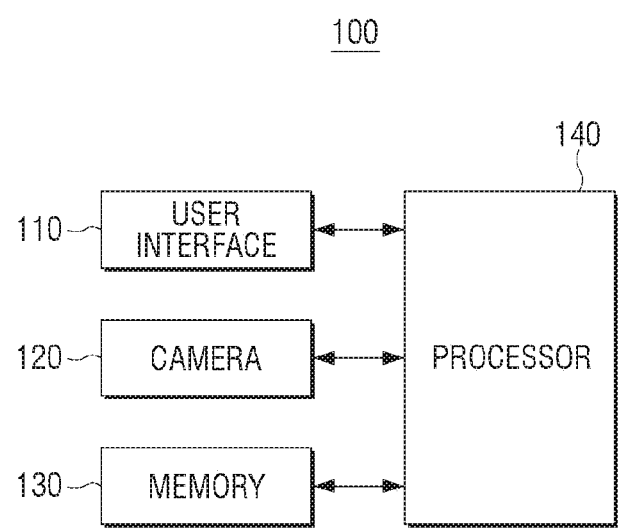
FIG. 1 is a block diagram illustrating an example of a configuration of an electronic apparatus according to an embodiment of the disclosure.

FIG. 1 is a block diagram illustrating an example of a configuration of an electronic apparatus according to an embodiment of the disclosure.

Referring to FIG. 1, the electronic apparatus 100 may be an apparatus capable of interacting with a user and may be, particularly, an apparatus capable of identifying a type of a user's emotion. The electronic apparatus 100 may include, for example, and without limitation, at least one of, a speaker, smartphones, tablet personal computers (PCs), mobile phones, video telephones, electronic book readers, desktop PCs, laptop PCs, netbook computers, a personal digital assistant (PDA), a portable multimedia player (PMP), an MP3 player, a camera, or the like. The embodiment is not limited thereto, and the electronic apparatus 100 may be any apparatus capable of interacting with a user.

The user's emotion means a mind or a feeling that is generated with respect to a phenomenon or an affair, and may be, for example, happiness, joy, sadness, anger, surprise, or the like. However, this is only an example, and the user's emotions may vary. The user's emotion may include emotion which is caused by a mental action but also caused by a physical action. For example, the user's emotions may include pain caused by catching a cold.

The electronic apparatus 100 may be an apparatus that identifies a type of a user's emotion using at least one of a text input from the user, an image of the user, or audio of the user. The electronic apparatus 100 may receive a text, capture an image of the user, or obtain audio of the user. For example, the electronic apparatus 100 may receive a text from a user and identify a type of a user's emotion from the text.

The electronic apparatus 100 may be an apparatus that operates based on the identified type of user's emotion. For example, the electronic apparatus 100 may include a display, and may be an apparatus that displays at least one recommendation emoticon corresponding to the identified type of user's emotion through the display. However, the disclosure is not limited thereto, and the electronic apparatus 100 may be an apparatus capable of making voice dialogue or text dialogue and may perform a dialogue with the user based on the identified type of user's emotion.

Referring to FIG. 1, the electronic apparatus 100 includes a user interface 110, a camera 120, a memory 130, and a processor 140.

The user interface 110 receives various user interactions. For example, the user interface 110 is configured to receive a text from a user and may be a device such as a keyboard, a touch pad, a mouse, or the like.

When the electronic apparatus 100 is implemented as a touch-based terminal device, the user interface 110 may be implemented with a touch screen forming a mutual layer structure with a touch pad. In this example, the user interface 110 may be used as a display.

The user interface 110 may include all the configurations capable of text input from a user. For example, the user interface 110 may include a configuration of converting the audio input from a microphone into a text to obtain the text.

The camera 120 is configured to capture a still image or a moving image under the control of a user of the processor 140 to be described later. The camera 120 may capture a still image at a specific point in time, but may also continuously capture the still image. When the electronic apparatus 100 is a mobile device including a display, the camera 120 may be implemented to capture a front of the display.

The camera 120 includes a lens, a shutter, an aperture, a solid-state imaging device, an analog front end (AFE), and a timing generator (TG). The shutter adjusts the time at which the light reflected by the subject enters the camera 120, and the aperture adjusts the amount of light incident on the lens by mechanically increasing or decreasing the size of an opening through which the light enters. The solid-state imaging device outputs an image by a photoelectric charge as an electric signal when the light reflected on the subject is accumulated as the photoelectric charge. TG outputs a timing signal for reading out pixel data of the solid-state imaging device, and AFE samples and digitizes the electrical signal output from the solid-state imaging device.

The memory 130 may store various artificial intelligence models. For example, the memory 130 may store at least one of a first artificial intelligence model trained to obtain information about emotion based on the input image, a second artificial intelligence model trained to obtain information about emotion based on a text, or a third artificial intelligence model trained to obtain information on emotion based on an audio. Hereinafter, for convenience, an artificial intelligence model corresponding to each of the input image, text, and audio will be described as a first artificial intelligence model, a second artificial intelligence model, and a third artificial intelligence.

The memory 130 may store a text input from a user, an image captured by the camera 120, audio received by a microphone, or the like.

The memory 130 may be implemented with a non-volatile memory, a volatile memory, or the like, but is not limited thereto. For example, a hard disk may be used instead of the memory 130 and any configuration which may use data is available.

The processor 140 controls overall operation of the electronic apparatus 100. The processor 140 may be connected to each configuration of the electronic apparatus 100 and may control overall operation of the electronic apparatus 100. For example, the processor 140 may be connected to the user interface 110, camera 120, and memory 130 for controlling an operation of the electronic apparatus 100.

The processor 140 may be implemented with at least one of a digital signal processor (DSP), a microprocessor, and a time controller (TCON), a central processing unit (CPU), a micro controller unit (MCU), a micro processing unit (MPU), a controller, an application processor (AP), a communication processor (CP), and an advanced reduced instruction set computing (RISC) machine (ARM) processor or may be defined as a corresponding term. The processor 140 may be implemented in a system on chip (SoC) type or a large scale integration (LSI) type in which a processing algorithm is built therein or in a field programmable gate array (FPGA) type.

When a text is input through the user interface 110, the processor 140 may identify whether the text includes first information about a user's emotion. For example, when the text "I feel good today!" is input through the user interface 110, the processor 140 may identify that the text includes first information about the user's emotion. Here, the first information may be happiness. Alternatively, the processor 140 may identify that the text does not include the first information about the user's emotion when the text "I have to go by 10 o'clock" is input through the user interface 110.

If the text includes the first information, the processor 140 may input the image obtained through the camera 120 to the first artificial intelligence model to obtain the second information on the emotion.

The processor 140 may identify the type of the user's emotion based on the first information obtained from the text and the second information obtained from the image. For example, the processor 140 may identify the type of the user's emotion as happiness if the first information obtained from the text is happiness and the second information obtained from the image is happiness. An example where the first information and the second information are different will be described below.

When the text includes the first information, the processor 140 may turn on the camera 120 to obtain an image and input the obtained image into the first artificial intelligence model. The processor 140 may turn on the camera 120 only when text is input from the user and the input text includes information about emotion. According to this operation, power consumption consumed by the camera 120 may be reduced.

The processor 140 may turn off the camera 120 if the additionally input text does not include the first information about the user's emotion after the camera 120 is turned on. However, the embodiment is not limited thereto, and the processor 140 may turn off the camera 120 after capturing only one image after the camera 120 is turned on. Alternatively, the processor 140 may turn off the camera 120 after a threshold time after the camera 120 is turned on. The processor 140 may turn off the camera 120 and then, when the user is recognized in the captured image after the camera 120 is turned on.

In the above description, an example where the first information is happiness is described, but is not limited thereto. For example, the processor 140 may identify information on a plurality of emotions from text. The first information may include at least one first emotion information and first reliability information of each of the at least one first emotion information, and the second information may include at least one second emotion information and at least one second reliability information of each of at least one second emotion information. For example, the first information may include happiness, joy, and composure, and the second information includes pleasure, composure, and reliability information that each has a reliability of 30%, 70%, and 10%. The second information may include happiness, composure, and sadness and may include reliability information that each of happiness, composure, and sadness has a reliability of 50%, 30%, and 60%.

The processor 140 may identify the type of the user's emotion by obtaining a weighted sum of the first reliability information and the second reliability information by types of emotion. According to the example described above, the processor 140 may obtain reliability information by 30%, 120%, 40%, 60% as a result of the weighted sum of the happiness, joy, composure, and sadness, and may determine the type of the user's emotion as happiness. Here, for convenience, it is assumed that each weight is the same.

The first information may include at least one first emotion information and first reliability information of each of the at least one first emotion information, and the processor 140 may, if the first reliability information of the at least one first emotion information is greater than or equal to a threshold value, identify that the text includes information about the user's emotion. For example, the first information may include reliability information that includes happiness, joy, and composure, and reliability information that each of happiness, joy, and composure has reliability of 5%, 7%, and 1%, and when the threshold value is 10%, the processor 140 may identify that the text does not include information on the user's emotion. This operation may be applied to the second information and the third information to be described later.

The memory 130 may store a second artificial intelligence model trained to obtain information about the emotion based on the text, and the processor 140 may input the text to the second artificial intelligence model to identify whether the text includes the first information from the obtained information. However, the processor 140 may identify whether the text includes the first information based on the words included in the text, without using an artificial intelligence model.

The electronic apparatus 100 may further include a microphone, the memory 130 may store a third artificial intelligence model trained to obtain information about the emotion based on the audio, and the processor 140 may turn on the microphone if the text includes the first information, obtain third information for emotion by inputting audio received through the microphone into a third artificial intelligence model, and identify the type of user's emotion based on the first information, the second information, and the third information. The processor 140 may turn on the microphone only if the text is input from the user and the input text includes information about the emotion. According to this operation, the power to be consumed by the microphone may be reduced.

The embodiment is not limited thereto and if the text is input from the user and the inputted text includes information on the emotion, the processor 140 may turn on the microphone before the camera 120. In this example, the processor 140 may identify the type of user's emotion based on the first information obtained from the text and the third information obtained from the audio. Alternatively, the processor 140 may turn on the camera 120 if the text is input from the user and the input text includes information about the emotion, and if the user is detected through the sensor, the processor 140 may turn on the camera 120, and if the user is not detected through the sensor, may turn on the microphone. The processor 140 may turn on the camera 120 if the text is input from the user and the input text includes information about the emotion, to obtain second information from the image if the captured image includes the user, and turn on the microphone if the captured image does not include the user.

It has been described that the processor 140 turns on the camera 120 or microphone when an emotion is included in the input text, but the embodiment is not limited thereto. For example, if the camera 120 or the microphone is always turned on and the emotion is included in the input text, the processor 140 may identify a type of the user's emotion from the data obtained from the camera 120 or microphone. The data is continuously obtained from the camera 120 or microphone, but the processor 140 may not perform an analysis operation until identifying that the emotion is included in the input text.

For example, the processor 140 may obtain a plurality of images in real time through the camera 120, and if the text includes the first information, the processor 140 may input the image obtained at the time when the text is input, among the plurality of images, to the first artificial intelligence model. Alternatively, the processor 140 may obtain audio in real-time through the microphone, and if the text includes the first information, the processor 140 may input an audio section in the audio, which is obtained from the time when the text has been input, to the third artificial intelligence model.

In this example, power consumption may be increased than when the camera 120 or microphone is off, but power consumption may be reduced, rather than identifying the type of emotion from all data. Rather than a case where the camera 120 or microphone is turned off, in a case where the camera 120 or microphone is turned on, an operation to identify the emotion may be accurate more. For example, if the camera 120 or microphone is off, it may take a certain amount of time until it is turned on again. For example, it may take the time required to analyze the text to determine turn-on, the time required for the turn-on itself, and the time taken to obtain data from the camera 120 or the microphone after the turn-on, and the accuracy may be lower because the emotional state of the user may change instantaneously after this time has elapsed.

The electronic apparatus 100 may further include a display, and the processor 140 may control the display to display at least one recommendation emoticon corresponding to the identified type of the user's emotion.

The electronic apparatus 100 may be a mobile device and may further include a display, and the camera 120 may be implemented to capture a front side of the display.

A function related to artificial intelligence may operate through the processor 140 and the memory 130.

The processor 140 may include one or a plurality of processors. The one or a plurality of processors may be a general-purpose processor such as a central processor (CPU), an application processor (AP), a digital signal processor (DSP), a dedicated processor, or the like, a graphics-only processor such as a graphics processor (GPU), a vision processing unit (VPU), an AI-only processor such as a neural network processor (NPU), or the like.

The one or more processors may control processing of the input data according to a predefined operating rule or AI model stored in the memory. If the one or a plurality of processor is an AI-only processor, the processor 120 may be designed with a hardware structure specialized for the processing of a particular AI model. The pre-defined operational rule or AI model are made through learning.

Being made through learning may refer to a predetermined operating rule or AI model set to perform a desired feature (or purpose) is made by making a basic AI model trained using various training data using learning algorithm. The learning may be accomplished through a separate server and/or system, but is not limited thereto and may be implemented in an electronic apparatus. Examples of learning algorithms include, but are not limited to, supervised learning, unsupervised learning, semi-supervised learning, or reinforcement learning.

The AI model may include a plurality of neural network layers. Each of the plurality of neural network layers includes a plurality of weight values, and may perform a neural network processing operation through an iterative operation leveraging results of a previous layer and a plurality of weight values. The plurality of weight values included in the plurality of neural network layers may be optimized by learning results of the AI model. For example, the weight values may be updated such that a loss value or a cost value obtained by the AI model is reduced or minimized during the learning process.

The artificial neural network may include deep neural network (DNN) and may include, for example, but is not limited to, convolutional neural network (CNN), recurrent neural network (RNN), restricted Boltzmann machine (RBM), deep belief network (DBN), bidirectional recurrent deep neural network (BRDNN), deep Q-networks, or the like.

The electronic apparatus 100 may further include a display, a microphone, and a communication interface.

The display may be implemented as a display of various types such as, for example, and without limitation, a liquid crystal display (LCD), organic light emitting diodes (OLED) display, or plasma display panel (PDP). In the display 150, a backlight unit, a driving circuit which may be implemented as an a-si thin film transistor (TFT), low temperature poly silicon (LTPS) TFT, organic TFT (OTFT), or the like, may be included as well. The display may be implemented as a touch screen coupled to a touch sensor, a flexible display, a third-dimensional (3D) display, or the like.

The microphone is configured to receive a user's voice or other sound to convert the sound to audio data.

The microphone may receive the user voice in an active state. For example, the microphone may be integrally formed as an integral unit on an upper side, a front side direction, a side direction, or the like of the electronic apparatus 100. The microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The electronic apparatus 100 may receive an audio signal including a user's voice from a sensor device including a microphone. In this example, the received audio signal may be a digital audio signal or an analog audio signal according to an embodiment. For example, the electronic apparatus 100 may receive an audio signal through a wireless communication method such as Bluetooth or Wi-Fi.

The communication interface is configured to communicate with various types of external devices according to various types of communication methods. The communication interface includes a Wi-Fi module, a Bluetooth module, an infrared communication module, a wireless communication module, or the like. Each communication module may be implemented as at least one hardware chip.

The processor 140 may communicate with various external devices using the communication interface. The external device may include a display device such as a television (TV), an external server, a Bluetooth earphone, or the like.

The Wi-Fi module and the Bluetooth module perform wireless communication using Wi-Fi method and Bluetooth protocols, respectively. When using the Wi-Fi module or the Bluetooth module, various connection information such as a service set identifier (SSID) and a session key may be transmitted and received to establish a communication session, and communication information may be transmitted after a communication connection is established.

The infrared ray communication module performs communication according to infrared data association (IrDA) technology that transmits data wireless to local area using infrared ray between visible rays and millimeter waves.

The wireless communication module may include at least one communication chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like, in addition to the communication modes described above.

The communication interface may also include at least one of a local area network (LAN) module, Ethernet module, or wired communication module performing communication using a pair cable, a coaxial cable, an optical cable, or the like.

The communication interface may further include input/output interface. The input/output interface may be one of the high-definition multimedia interface (HDMI), mobile high-definition link (MHL), universal serial bus (USB), display port (DP), Thunderbolt, video graphics array (VGA) port, red, green, and blue (RGB) port, d-subminiature (D-SUB), digital visual interface (DVI), and the like.

The input and output interface may input and output at least one of an audio signal or a video signal.

According to an example, the input and output interface may include a port to input and output only an audio signal or a port to input and output only a video signal as a separate port, or may be implemented as a port which input and output both the audio signal and the video signal.

The electronic apparatus 100 may further include a speaker (not shown) and the speaker may be an element to output not only various audio data processed by the input/output interface but also various notification sounds, a voice message, or the like.

As described above, when a text includes information on the emotion, the electronic apparatus 100 may identify the type of the user's emotion by further using data obtained from at least one of the camera 120 or microphone.

Hereinbelow, an operation of the electronic apparatus 100 will be described in greater detail through FIGS. 2 to 6C. FIGS. 2 to 6C illustrate an individual embodiment for description. The individual embodiment of FIGS. 2 to 6C may be implemented in any combination form.

Figure 2:
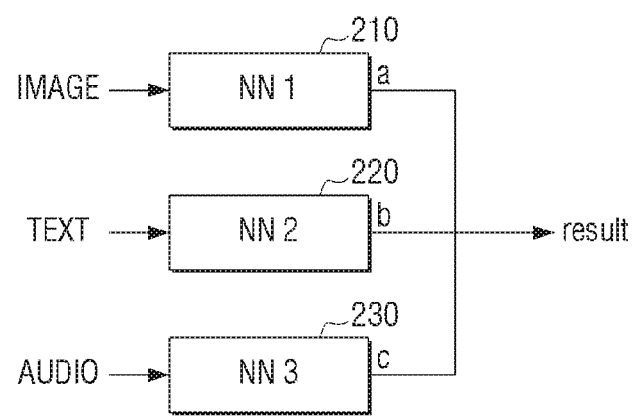
FIG. 2 is a diagram illustrating a method of identifying a type of a user's emotion according to an embodiment of the disclosure.

FIG. 2 is a diagram illustrating a method of identifying a type of a user's emotion according to an embodiment of the disclosure.

Referring to FIG. 2, the processor 140 may use a first artificial intelligence model (neural network 1 (NN1)) 210, a second artificial intelligence model (NN2) 220, and a third artificial intelligence model (NN3) 230 to identify the type of the user's emotion. The first artificial intelligence model 210, the second artificial intelligence model 220, and the third artificial intelligence model 230 may be information stored in the memory 130.

The processor 140 may input a text into the second artificial intelligence model 220 to identify whether the input text includes first information about the user's emotion. The second artificial intelligence model 220 is a model trained to obtain information about emotion based on the text, and may be obtained by learning information about emotion corresponding to the plurality of sample text and the plurality of sample texts, respectively. In particular, the second artificial intelligence model 220 may be a model that learns a relationship between the words as well as the words included in the sentence and the relationships between the sentences within the dialogue.

An output b of the second artificial intelligence model 220 may include reliability information for each type of emotion. For example, if the text is input to the second artificial intelligence model 220, the happiness (30%) and the joy (5%) can be output. The numbers in parenthesis indicates the reliability information for each type of emotion, and the higher the number the more accurate the information. The processor 140 may utilize only the emotion with reliability information greater than or equal to a threshold. In an example, if the threshold is 10%, the processor 140 may use only the happiness (30%) from the text as the first information. In this example, since the text includes the first information, the processor 140 will perform additional operations using the camera 120 or the microphone 160.

If the output b of the second artificial intelligence model 220 is joy (5%), the processor 140 may identify that the text does not include the first information, and may not perform an additional operation using the camera 120 or the microphone 160.

The second artificial intelligence model 220 itself may be trained so as not to output an emotion type having a reliability less than or equal to a threshold value. In this example, the threshold value is 10%, and the second artificial intelligence model 220 may output only happiness (30%) out of happiness (30%) and joy (5%). In this example, if there is an output of the second artificial intelligence model 220, the processor 140 may perform additional operations using the camera 120 or the microphone 160, and may not perform additional operations using the camera 120 or the microphone 160 when there is no output of the second artificial intelligence model 220.

If the text includes the first information, the processor 140 may input the image obtained through the camera 120 to the first artificial intelligence model 210 to obtain second information about the emotion as the output a of the first artificial intelligence model 210. The first artificial intelligence model 210 is a model trained to obtain information on emotion based on an image, and may be obtained by learning information on emotion corresponding to a plurality of sample images and a plurality of sample images, respectively.

The processor 140 may input audio obtained through the microphone 160 to the third artificial intelligence model 230 if the text includes the first information to obtain third information for the emotion as the output c of the third artificial intelligence model 230. The third artificial intelligence model 230 is a model trained to obtain information about emotion based on the audio, and may be obtained by learning a plurality of sample audios and information on emotions corresponding to each of the plurality of sample audios.

The processor 140 may identify a type of the user's emotion based on first information, second information, and third information. For example, the processor 140 may calculate a weighted sum by types of the emotion by using the equation shown below:

$$\text{Reliability by types } (i) \text{ of emotion} = Wa \times ai + Wb \times bi + Wc \times ci \quad \text{Equation 1}$$

where i denotes the type of emotion, ai is the reliability of the type of $i^{th}$ emotion among the type of at least one emotion obtained from the image, bi is the reliability of the type of $i^{th}$ emotion of the type of at least one emotion obtained from the text, ci is the reliability of the type of $i^{th}$ emotion among the type of at least one emotion obtained from the audio, Wa is the weight of reliability obtained from the image, Wb is the weight of the reliability obtained from the text, and Wc is the weight of reliability obtained from the audio.

As described above, when the text includes the first information, a type of the user's emotion is identified by further considering at least one of the second information or third information. However, embodiments of the present disclosure are not limited thereto.

For example, the processor 140 may update the first information based on at least one of the second information or the third information if the text includes the first information. The processor 140 may identify the type of emotion of the user based on the updated first information, the second information, and the third information. That is, the processor 140 may input updated first information other than the first information to the above equation to identify the type of the user's emotion.

Through the above method, an accuracy of the user's emotion obtained from a text may be further improved. Only when the emotion is identified from the text, the camera 120 or the microphone 160 is used, power consumption can be reduced compared to the related art.

Figure 3:
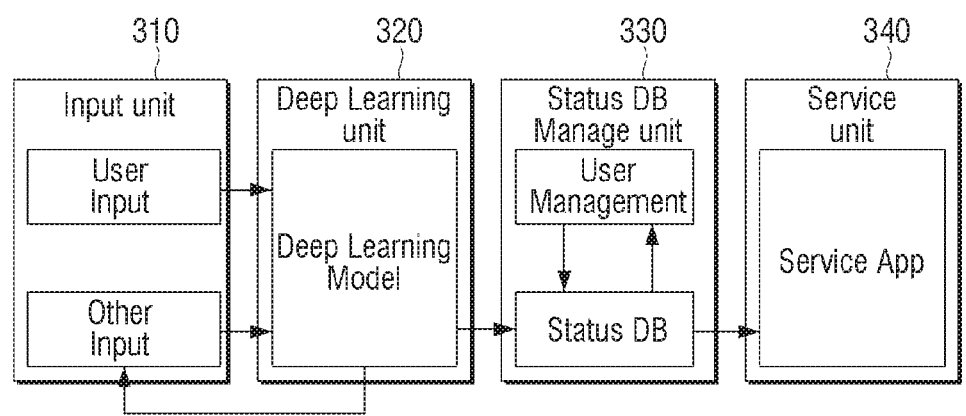
FIG. 3 is a diagram illustrating an operation of identifying a type of emotion according to an embodiment of the disclosure.

FIG. 3 is a diagram illustrating an operation of identifying a type of emotion according to an embodiment of the disclosure.

The plurality of units included in FIG. 3 may be implemented as software like a module or as hardware as a configuration of the processor 140.

Referring to FIG. 3, an input unit 310 may receive a user input or other inputs. For example, the input unit 310 may receive a text from a user. Alternatively, the input unit 310 may obtain an image of the user or audio of the user, which may be obtained by the control signal of the deep learning unit 320. For example, if the output of the second artificial intelligence model of the deep learning unit 320 includes emotion, a control signal to turn on camera 120 or microphone 160 may be generated, and the input unit 310 may obtain the user's image or user's audio based on the control signal.

The deep learning unit 320 may include a plurality of artificial intelligence models, and may process the input data by an artificial intelligence model corresponding to the type of the input data.

The deep learning unit 320 may identify the type of the user's emotion from output of each of the plurality of artificial intelligence models.

The deep learning unit 320 may generate a control signal to use another input and provide the signal to the input unit 310, and may provide the identified type of emotion to a state management unit 330.

The state management unit 330 may store a type of the user's emotion. The state management unit 330 may provide a type of the user's emotion to a service unit 340 upon request of the service unit 340.

The service unit 340 may request a type of the user's emotion to the state management unit 330 and receive the same and may provide a service based on the received information. For example, when one of the service unit 340 is a message application, the message application may request a type of the user's emotion to the state management unit 330 to receive a type of the emotion of anger, and may provide emoticons of angry expression to a use as a recommended emoticon.

If one of the service unit 340 is a music application, the music application may request a type of the user's emotion to the state management unit 330 to receive a type of the emotion of composure, and may recommend or reproduce a classic music.

Figure 4:
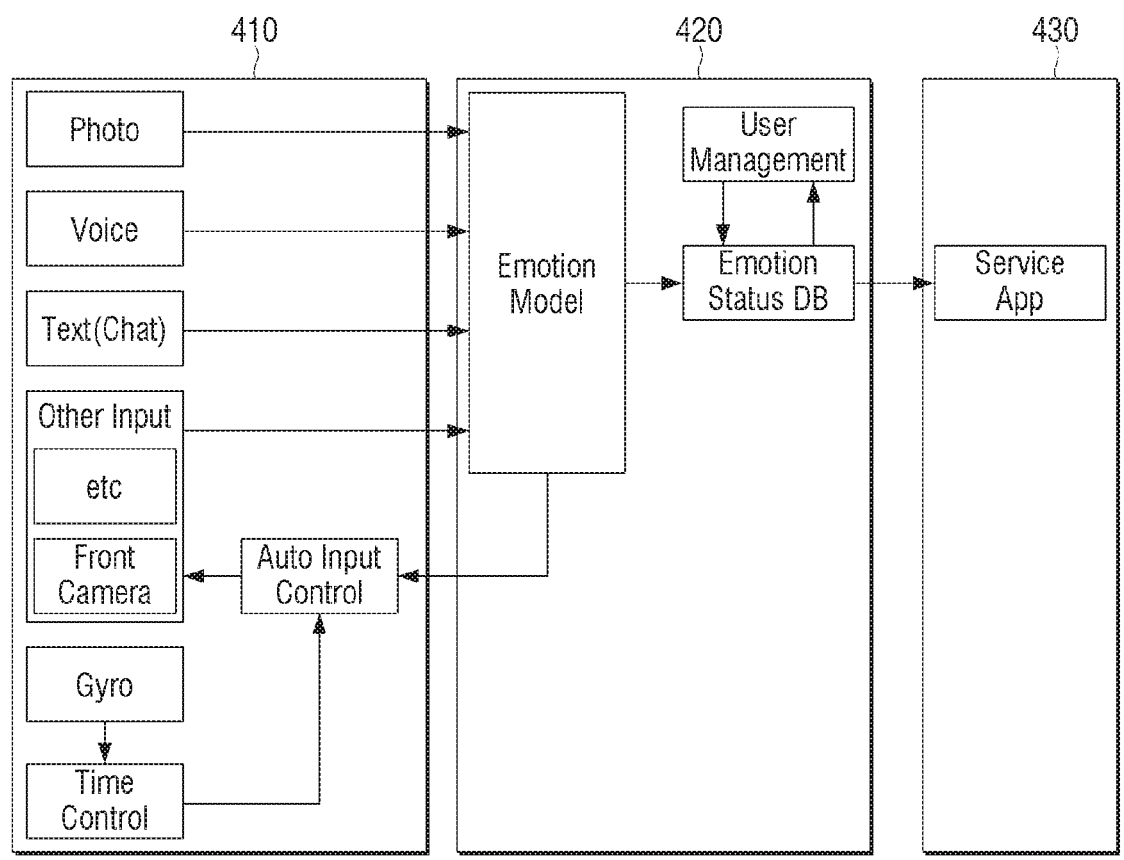
FIG. 4 is a diagram illustrating an operation of identifying a type of an emotion in greater detail according to an embodiment of the disclosure.

FIG. 4 is a diagram illustrating an operation of identifying a type of an emotion in greater detail according to an embodiment of the disclosure.

Referring to FIG. 4, the part overlapping with the elements of FIG. 3 will not be further described.

As described above, if a text includes emotion, the camera 120 or the microphone 160 is turned on, but the embodiment is not limited thereto. For example, when a user inputs a text, a motion of the electronic apparatus 100 may be detected by a Gyro sensor. When a motion is detected, the processor 140 may turn on the camera 120 or microphone 160 to obtain an image or audio. Through this operation, the processor 140 may obtain a user's image or audio at the time when the text is input. In case of an image, the processor 140 may obtain a plurality of images periodically for a preset time through time control.

If it is identified that emotion is included in the text, the processor 140 may input the obtained image or audio to a corresponding artificial intelligence model. If the image or audio is obtained by the Gyro sensor, if it is identified that emotion is included in the text, the processor 140 may not turn on the camera 120 or microphone 160 again.

Figure 5B:
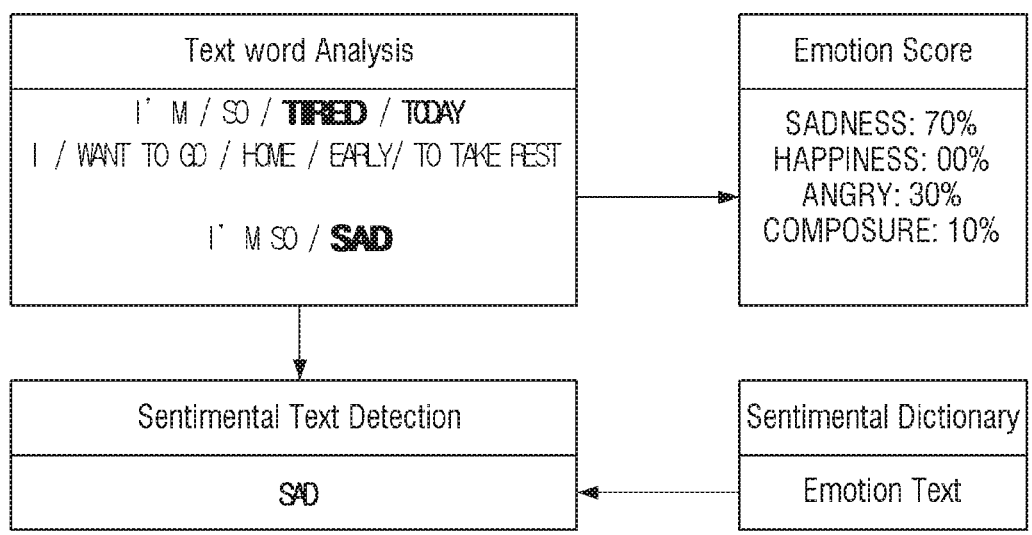
Figure 5C:
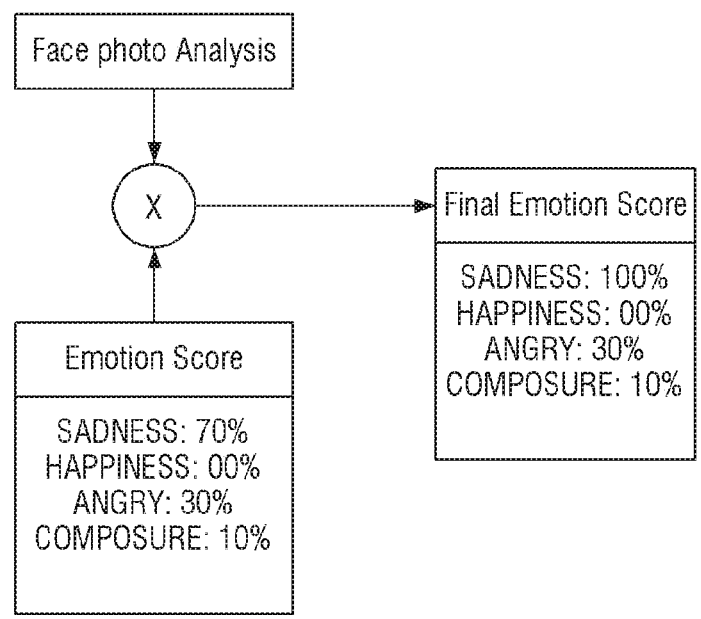

FIGS. 5A, 5B, and 5C are diagrams illustrating an embodiment of the present disclosure in greater detail.

Referring to FIG. 5A, the processor 140 may drive a dialogue application between a user A of the electronic apparatus 100 and a user B who is a counterpart.

Referring to FIG. 5B, the processor 140 may identify a plurality of types of emotions of a user based on some words among texts of the user A and may calculate each reliability information.

The processor 140 may identify the type of the user's emotion as sadness from additional utterance of the user A.

Referring to FIG. 5C, the text includes the emotion, and the processor 140 may turn on the camera 120 to capture an image of the user and may input the captured image to the first artificial intelligence model. The processor 140 may determine the type of the user's emotion as sadness by further considering the output of the first artificial intelligence model.

If only the text is used, the reliability of sadness is 70%, but as an image is additionally used, reliability of sadness may be improved to 100%. That is, the processor 140 may improve reliability of the type of the emotion obtained from the text by additionally using an image captured by the camera 120.

Figure 6A:
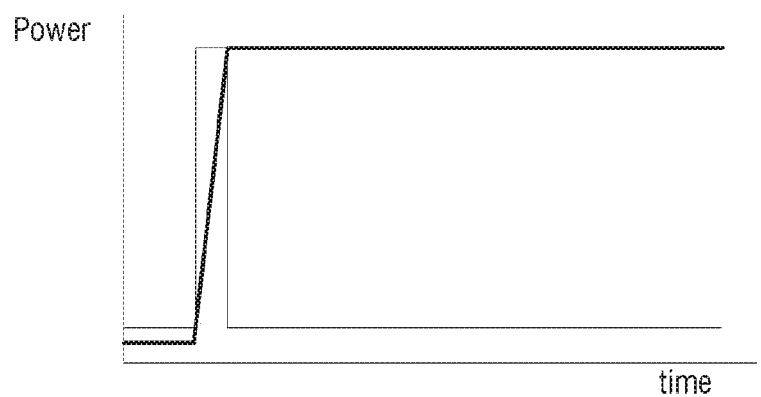
FIG. 6A is a diagram illustrating power consumption according to the related art.
Figure 6B:
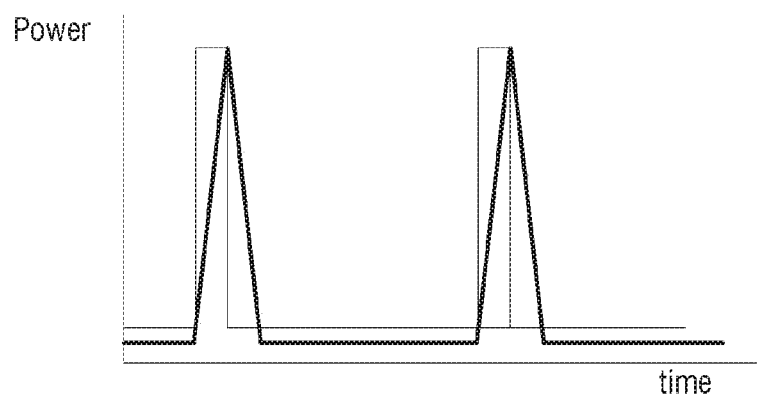
FIGS. 6B and 6C are diagrams illustrating power consumption according to various embodiments of the disclosure.
Figure 6C:
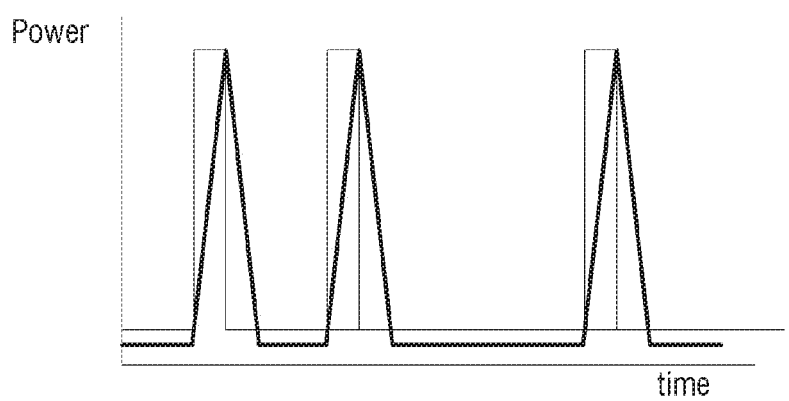

FIG. 6A is a diagram illustrating power consumption according to the related art, and FIGS. 6B and 6C are diagrams illustrating power consumption according to various embodiments of the disclosure.

FIGS. 6A to 6C illustrate using the camera 120 and power consumption for convenience, and control of the camera 120 is illustrated in a thin line and power consumption is illustrated in a thick line.

FIG. 6A illustrates power consumption according to the related art, and if there is one time of control of a camera, power consumption may be continuously maintained by the control to maintain a camera with a live view.

FIG. 6B illustrates using a Gyro sensor. When a motion of the electronic apparatus 100 is detected by the Gyro sensor, the image may be captured at the moment, and the camera 120 may be turned off again. Accordingly, the power can be consumed only at the time of capturing the image.

Referring to FIG. 6C, when the text includes emotion, an image may be captured at the moment, and the camera 120 may be turned off again and power consumption may be reduced in the similar manner as FIG. 6B.

Referring to FIGS. 6B and 6C, the camera 120 may be driven at only a specific time to minimize power consumption, and type of the user's emotion can be identified by an image while minimizing driving of the camera 120, to maintain accuracy.

Figure 7:
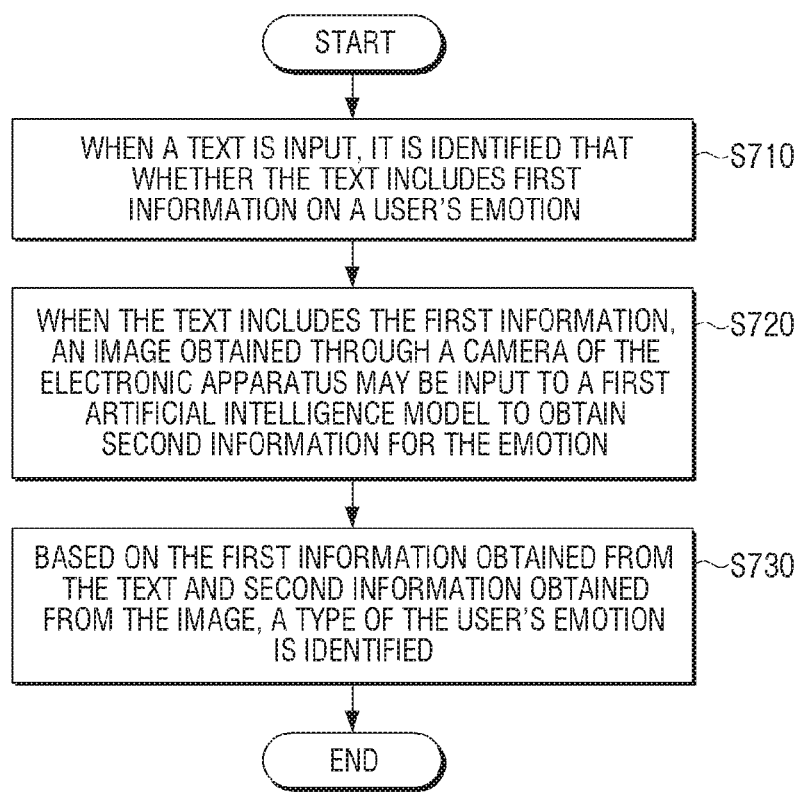
FIG. 7 is a flowchart illustrating a method for controlling an electronic apparatus according to an embodiment of the disclosure.

FIG. 7 is a flowchart illustrating a method for controlling an electronic apparatus according to an embodiment of the disclosure.

Referring to FIG. 7, when a text is input, it is identified that whether the text includes first information on a user's emotion in operation S710. When the text includes the first information, an image obtained through a camera of the electronic apparatus may be input to a first artificial intelligence model to obtain second information for the emotion in operation S720. Based on the first information obtained from the text and second information obtained from the image, a type of the user's emotion is identified in operation S730.

The operation of obtaining second information in operation S720 may include, based on a text including first information, turning on a camera to obtain an image and inputting the obtained image to the first artificial intelligence model.

The operation of turning off the camera, based on a text additionally input after the camera is turned not including first information on the user's emotion, may be further included.

The first information may include at least one first emotion information and first reliability information of each of the at least one first emotion information, second information may include at least one second emotion information and second reliability information of each of the at least one second emotion information, and the operation of identifying the type of the user's emotion in operation S730 may identify the type of the user's emotion by obtaining a weighted sum of the first reliability information and second reliability information by types of emotion.

The first information may include at least one first emotion information and first reliability information for each of the at least one emotion information and the identifying whether the first information is included in operation S710 may include, based on the first reliability information of the at least one first emotion information being greater than or equal to a threshold value, identifying that the text includes information on the user's emotion.

The operation of identifying whether first information is included in operation S710 may identify whether the text includes the first information from the obtained information by inputting the text to the second artificial intelligence model.

The operation of, based on a text including first information, turning on a microphone of the electronic apparatus and obtaining third information for emotion by inputting audio received through a microphone to a third artificial intelligence model to obtain third information on emotion and the operation of identifying a type of the user's emotion in operation S730 may include identifying a type of the user's emotion based on the first information, second information, and third information.

The obtaining of the second information in operation S720 may include obtaining a plurality of images through a camera in real time and, based on a text including first information, inputting an image obtained from a time when a text is input among a plurality of images to the first artificial intelligence model.

The operation of displaying at least one recommended emoticon corresponding to the identified type of the user's emotion through the display of the electronic apparatus may be further included.

The electronic apparatus is a mobile device including a display, and the operation of obtaining second information in operation S720 may include capturing a front side of the display through a camera.

According to various embodiments of the disclosure, the electronic apparatus may, based on a type of a user's emotion being identified from a text, turn on a camera or a microphone, thereby reducing power consumption, and may improve reliability of a type of the user's emotion by further considering an image or an audio obtained from the camera or microphone.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, image processing apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to an embodiment of the disclosure, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

The above-described various embodiments may be implemented in a computer—or similar device—readable recording medium using software, hardware, or a combination thereof. In some embodiments, the embodiments described herein may be implemented by the processor itself. Through the software implementation, the embodiments such as a procedure and function described herein may be implemented with separate software modules. The software modules may perform one or more functions and operations described herein.

Computer instructions for performing the processing operations of a device according to various embodiments described above may be stored in a non-transitory computer-readable medium. The computer instructions stored in the non-transitory computer-readable medium, when executed by a processor of a particular device, may cause a particular device to perform processing operation in the device according to the various embodiments described above. A non-transitory computer-readable medium refers to a medium that stores data semi-permanently, rather than a medium that stores data for a short time, such as a register, cache, memory, etc., and is capable of being read by a device. A specific example of a non-transitory computer-readable medium may be a compact disc (CD), a digital versatile disc (DVD), a hard disk, a Blu-ray disc, a universal serial bus (USB), a memory card, a read only memory (ROM), and the like.

According to various embodiments of the disclosure, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
 a user interface;
 a camera;
 a memory configured to store a first artificial intelligence model trained to obtain information on an emotion based on an input image; and
 a processor, connected to the user interface, the camera, and the memory, configured to control the electronic apparatus,
 wherein the processor is configured to:
  based on text being input through the user interface, identify whether the text includes first information on a user's emotion,
  based on the text including the first information, obtain second information for the emotion by inputting the image obtained through the camera to the first artificial intelligence model, and
  identify a type of the user's emotion based on the first information obtained from the text and the second information obtained from the image.

2. The electronic apparatus of claim 1, wherein the processor is further configured to:
 based on the text including the first information, obtain the image by turning on the camera, and
 input the obtained image to the first artificial intelligence model.

3. The electronic apparatus of claim 2, wherein the processor is further configured to, based on text additionally input after the camera is turned on not including the first information on the user's emotion, turn off the camera.

4. The electronic apparatus of claim 1,
 wherein the first information comprises at least one first emotion information and first reliability information of each of the at least one first emotion information,
 wherein the second information comprises at least one second emotion information and second reliability information of each of the at least one second emotion information, and
 wherein the processor is further configured to identify a type of the user's emotion by obtaining a weighted sum of the first reliability information and the second reliability information by types of emotions.

5. The electronic apparatus of claim 1,
 wherein the first information comprises at least one first emotion information and first reliability information of each of the at least one first emotion information, and
 wherein the processor is further configured to:
  based on the first reliability information of the at least one first emotion information being greater than or equal to a threshold value, identify that the text includes information on the emotion of the user.

6. The electronic apparatus of claim 1,
 wherein the memory is configured to store a second artificial intelligence model trained to obtain information on an emotion based on a text, and
 wherein the processor is further configured to identify whether the text includes the first information from information obtained by inputting the text to the second artificial intelligence model.

7. The electronic apparatus of claim 1, further comprising:
 a microphone,
 wherein the memory is configured to store a third artificial intelligence model trained to obtain information on an emotion based on audio, and
 wherein the processor is further configured to:
  based on the text including the first information, turn on the microphone,
  obtain third information on an emotion by inputting audio received through the microphone to the third artificial intelligence model, and
  identify a type of the user's emotion based on the first information, the second information, and the third information.

8. The electronic apparatus of claim 1, wherein the processor is further configured to:
 obtain a plurality of images through the camera in real time, and
 based on the text including the first information, input an image obtained from a time when the text is input among the plurality of images to the first artificial intelligence model.

9. The electronic apparatus of claim 1, further comprising:
 a display,
 wherein the processor is further configured to control the display to display at least one recommended emoticon corresponding to the identified type of user's emotion.

10. The electronic apparatus of claim 1,
 wherein the electronic apparatus is a mobile device, the electronic apparatus further comprising a display, and
 wherein the camera is configured to capture a front side of the display.

11. The electronic apparatus of claim 1, wherein the processor is further configured to:
 identify the type of the emotion as one of a plurality of emotions according to a reliability of each of the plurality of emotions, a reliability of the first information, and a reliability of the second information.

12. The electronic apparatus of claim 1, wherein the processor is further configured to:
 activate a corresponding function of an application according to the identified type of emotion.

13. A method of controlling an electronic apparatus, the method comprising:
 based on text being input, identifying whether the text includes first information on a user's emotion;
 based on the text including the first information, obtaining second information for the emotion by inputting an image obtained through a camera of the electronic apparatus to a first artificial intelligence model; and
 identifying a type of the emotion based on the first information obtained from the text and the second information obtained from the image.

14. The method of claim 13, wherein the obtaining of the second information comprises:
 based on the text including the first information, obtaining the image by turning on the camera, and
 inputting the obtained image to the first artificial intelligence model.

15. The method of claim 14, further comprising:
 based on text additionally input after the camera is turned on not including the first information on the user's emotion, turning off the camera.

16. The method of claim 13,
 wherein the first information comprises at least one first emotion information and first reliability information of each of the at least one first emotion information,
 wherein the second information comprises at least one second emotion information and second reliability information of each of the at least one second emotion information, and wherein the identifying of the type of the emotion comprises identifying a type of the user's emotion by obtaining a weighted sum of the first reliability information and the second reliability information by types of emotions.

17. The method of claim 13,
wherein the first information comprises at least one first emotion information and first reliability information of each of the at least one first emotion information, and
wherein the identifying of whether the first information is included comprises, based on the first reliability information of the at least one first emotion information being greater than or equal to a threshold value, identifying that the text includes information on the emotion of the user.

18. The method of claim 13, wherein the identifying of whether the first information is included comprises identifying whether the text includes the first information from information obtained by inputting the text to a second artificial intelligence model.

19. The method of claim 13, further comprising:
based on the text including the first information, turning on a microphone of the electronic apparatus; and
obtaining third information on an emotion by inputting audio received through the microphone to a third artificial intelligence model,
wherein the identifying of the type of user's emotion comprises identifying a type of user's emotion based on the first information, the second information, and the third information.

20. The method of claim 13, wherein the obtaining of the second information comprises:
obtaining a plurality of images through the camera in real time, and
based on the text including the first information, inputting an image obtained from a time when the text is input among the plurality of images to the first artificial intelligence model.

* * * * *